United States Patent
Yoon et al.

(10) Patent No.: US 6,687,264 B1
(45) Date of Patent: Feb. 3, 2004

(54) METHOD FOR REASSIGNING CHANNELS DURING TRANSMISSION OF IEEE-1394 ISOCHRONOUS DATA TO EXTERNAL SYNCHRONOUS NETWORK AND APPARATUS THEREFOR

(75) Inventors: Ho-sik Yoon, Seoul (KR); Sung-bong Kang, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/442,242

(22) Filed: Nov. 17, 1999

(30) Foreign Application Priority Data

Nov. 18, 1998 (KR) .............................................. 98-49497

(51) Int. Cl.⁷ ................................................. H04J 1/00
(52) U.S. Cl. ........................ 370/490; 370/432; 370/466; 710/315
(58) Field of Search ............................... 370/352, 356, 370/389, 400, 401, 402, 403, 437, 432, 465, 466, 467, 473, 474, 490, 431, 469, 468; 709/217, 218; 710/305, 306, 315

(56) References Cited

U.S. PATENT DOCUMENTS

| | | | |
|---|---|---|---|
| 6,115,392 A | * | 9/2000 | Nomura ...................... 370/466 |
| 6,243,395 B1 | * | 6/2001 | Fujimori et al. ............ 370/466 |
| 6,523,696 B1 | * | 2/2003 | Saito et al. .................. 709/223 |

FOREIGN PATENT DOCUMENTS

| | | |
|---|---|---|
| EP | 0 835 037 A2 | 4/1998 |
| EP | 0 837 579 A2 | 4/1998 |
| EP | 08 37 579 A2 | 4/1998 |
| EP | 08 41 833 A2 | 5/1998 |
| JP | 9-275402 | 10/1997 |
| JP | 10-126423 | 5/1998 |
| JP | 10-200583 | 7/1998 |

OTHER PUBLICATIONS

Miyashita et al. "Real–time DV Transmission on Hybird Network with IEEE 1394 and ATM," IEEE, Jun. 22, 1999–Jun. 24, 1999, pp. 148–149.*

Hwang et al. "Standardization Activities and Technology Competitors for the In–Home Networking" Internal Conference on Communication Technology, Oct. 22–24, 1998, Beijing , China, pp. S45–07–1–S45–07–5.*

* cited by examiner

Primary Examiner—Douglas Olms
Assistant Examiner—Bob A. Phunkulh
(74) Attorney, Agent, or Firm—Sughrue Mion, PLLC (57) ABSTRACT

A method for reassigning channels during the transmission of IEEE-1394 isochronous data to an external synchronous network and an apparatus therefor are provided. The method for reassigning channels during the transmission of isochronous data from the IEEE-1394 network to an external synchronous network includes the steps of (a) forming a mapping table showing the relationship between the channels of the IEEE-1394 network and the channels of the external synchronous network when a call is set with respect to the external synchronous network, (b) reading the channel order from the header of the isochronous data to be transmitted, (c) reassigning the channel order of the IEEE-1394 network according to the channel order of the external synchronous network with reference to the mapping table, and (d) transmitting the isochronous data to the external synchronous network according to the reassigned channel order.

6 Claims, 9 Drawing Sheets

METHOD FOR REASSIGNING CHANNELS DURING TRANSMISSION OF IEEE-1394 ISOCHRONOUS DATA TO EXTERNAL SYNCHRONOUS NETWORK AND APPARATUS THEREFOR

BACKGROUND OF THE INVENTION

1. Field of the Invention

The present invention relates to synchronous adaptation between networks, and more particularly, to a method for reassigning channels during the transmission of IEEE-1394 isochronous data to an external synchronous network between the IEEE-1394 network and an external synchronous network and an apparatus therefor.

2. Description of the Related Art

At the present time, there are various digital devices such as a digital TV (DTV), a digital video camera (DVC), a digital versatile disk player (DVDP), a digital set-top box, etc. The IEEE-1394 standard approved by the IEEE committee is attracting attention as a digital network interface to establish a network with such devices. The network for connecting a DTV, a DVCR, a DVDP, a digital set-top box, etc. to each other using the IEEE-1394 standard is currently established by only the 1394 bus.

However, the synchronous adaptation of the IEEE-1394 network to an external network such as an asynchronous transfer mode (ATM) network and a public switched telephone network (PSTN) is essential for a home network or small office home office (SOHO) environment. In the synchronous adaptation to an external network, the IEEE-1394 network is different from other networks in various aspects, which makes synchronization among networks, which is basic to the adaptation of one network to another, difficult to perform.

Figure 1:
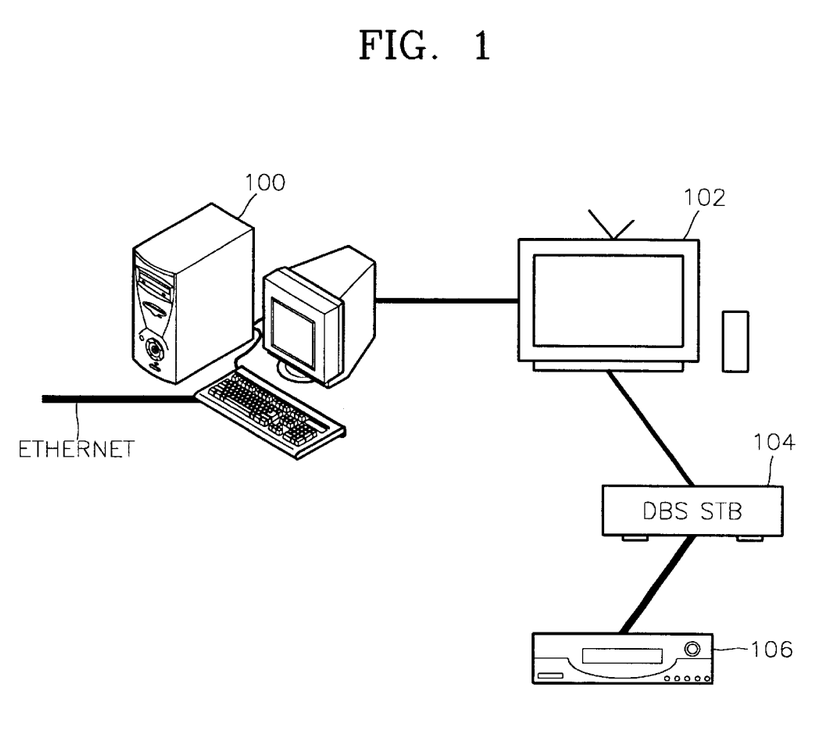
FIG. 1 schematically shows a network connected by the IEEE-1394 bus.

FIG. 1 schematically shows a network connected by the IEEE-1394 bus. Referring to FIG. 1, various digital devices 100 through 106 are connected to each other by the IEEE-1394 bus at home. The Internet service is performed from the outside to the various digital devices through Ethernet. However, since such a constitution has no reliability with respect to time, the constitution is not suitable for the real-time transmission of data and has no concept of synchronization.

Figure 2:
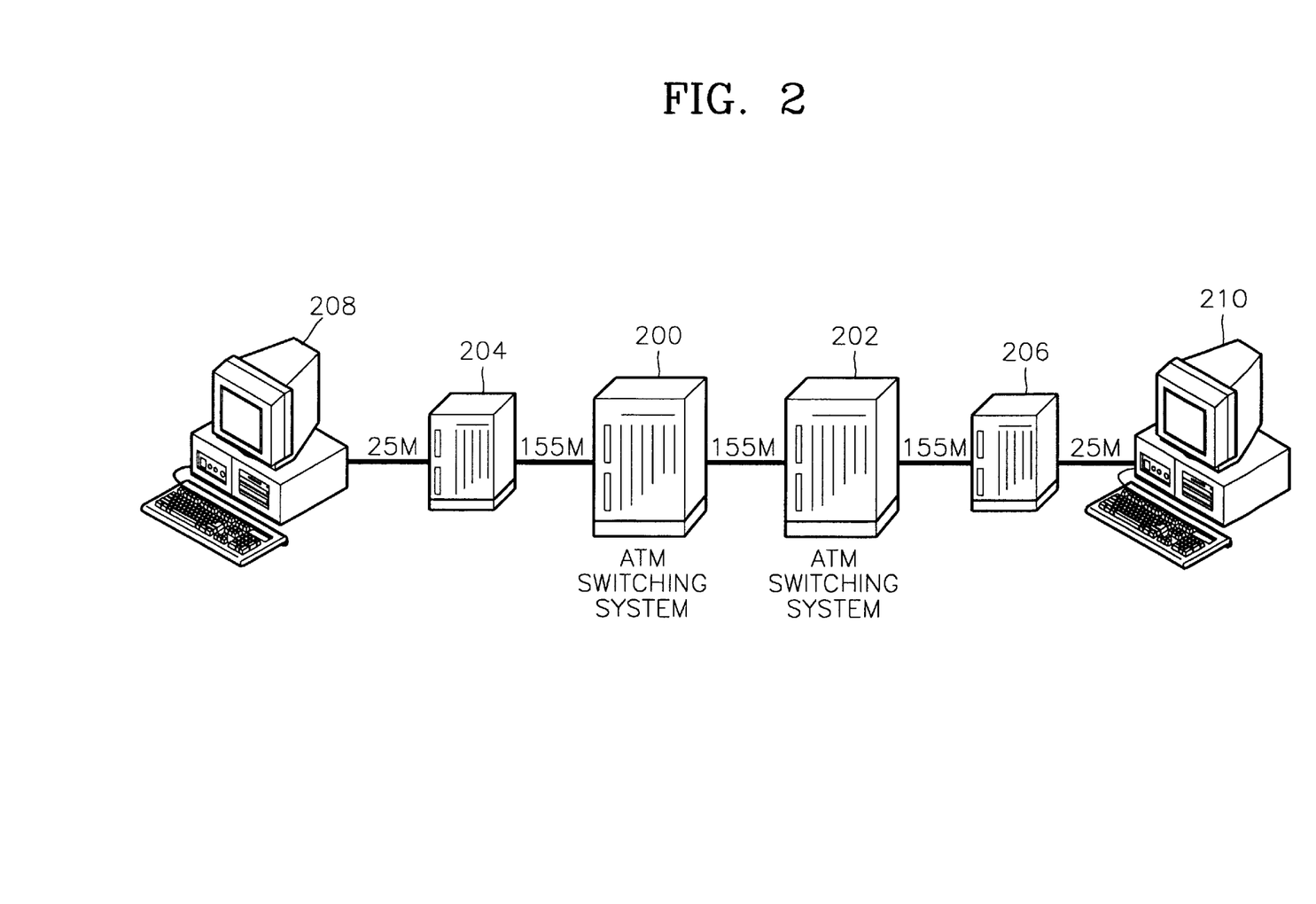
FIG. 2 schematically shows an asynchronous transfer mode (ATM) network.

FIG. 2 schematically shows an ATM network. Two Central ATM switching systems 200 and 202 of a core network denote a network node interface (NNI) between central telephone offices. ATM switching systems 204 and 206 denote a user network interface (UNI) between subscribers 208 and 210 and the NNI.

Figure 3:
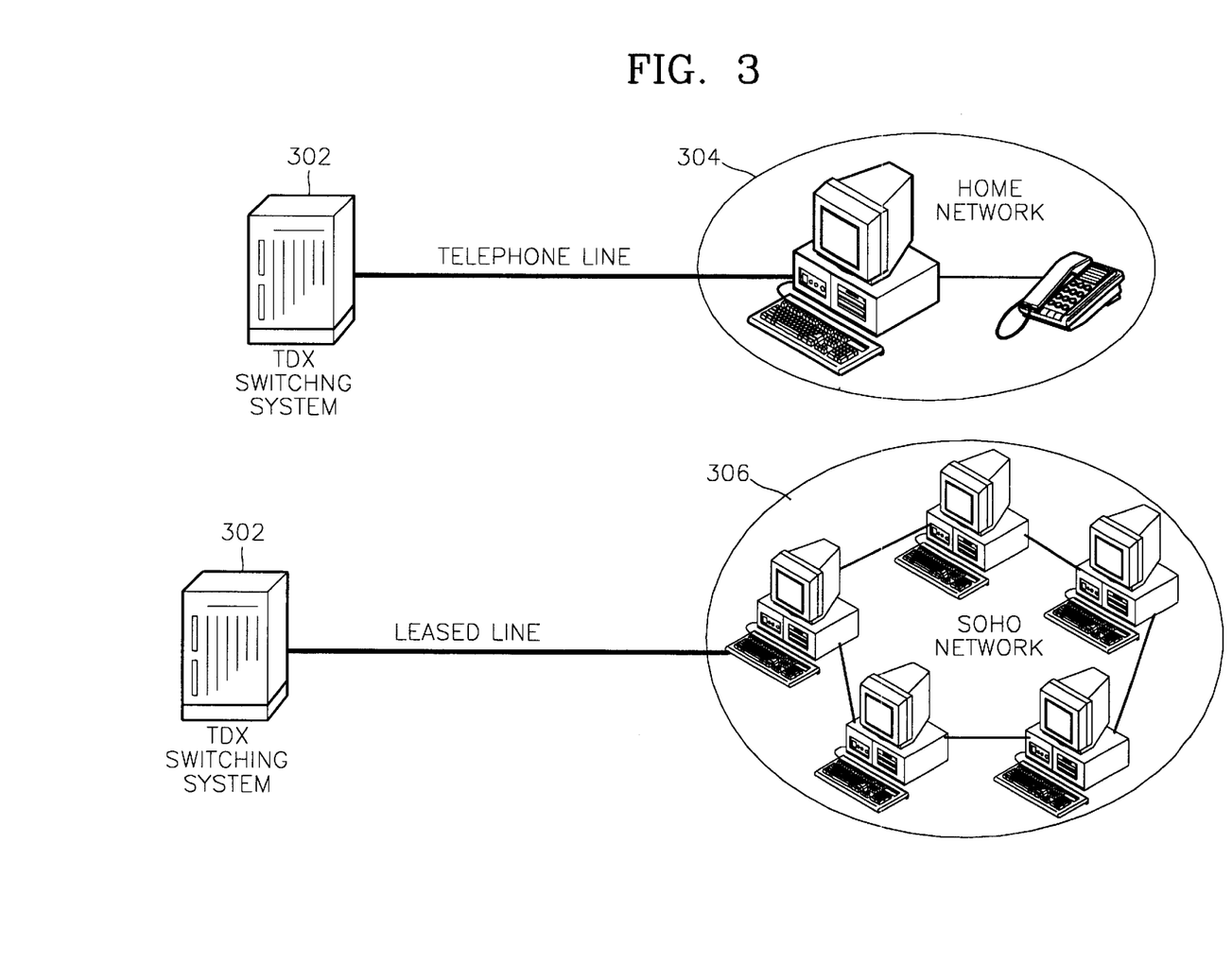
FIG. 3 schematically shows a public switched telephone network (PSTN)

FIG. 3 schematically shows a PSTN. A case where a TDX switching system 302 of the central telephone office is connected to a home network 304 through a telephone line and a case where the TDX switching system 302 is connected to a SOHO network 305 through a leased line are shown.

These networks currently operate independently. The adaptation of the home network or SOHO network environment connected by the IEEE-1394 bus to the external network will be performed hereafter. However, the ATM network and the PSTN which are external networks are fundamentally different from the IEEE-1394 network in the transmission of isochronous data, which makes the synchronization among the networks which is basic to the adaptation of one network to another, difficult to perform. There is no solution to the synchronization of the IEEE-1394 network with the external network.

In a current situation where the respective networks shown in FIGS. 1 through 3 are constituted, the Internet service is provided by the synchronous adaptation of the IEEE-1394 network to the Ethernet. However, since the adaptation of the IEEE-1394 network to the Ethernet has no concept of synchronization and the transmission of the IEEE-1394 isochronous data is not guaranteed as mentioned above, it is not possible to provide a real time service.

Meanwhile, in the case of the ATM adaptation layer 1 (AAL1) method of the ATM or the time division multiplexing (TDM) method of the PSTN, the synchronization is performed at uniform time intervals and real time speech and data services are guaranteed. Also, data is uniformly transmitted in the order of assigned channels. However, in the case of the IEEE-1394 network, a synchronous signal should be generally generated at 125 µs intervals. However, it is not possible to guarantee the 125 µs intervals due to the influence of asynchronous transmission. Namely, a cycle start packet which is a synchronous signal can be delayed more than 125 µs and transmitted. Also, the order of the transmitted data channels cannot be guaranteed to be uniform unlike the ATM or the PSTN.

As the IEEE-1394 network becomes the solution of the home network and the SOHO network, the adaptation of the IEEE-1394 network to the ATM network or the adaptation of the IEEE-1394 network to the PSTN is essential. Therefore, the problem of synchronization among the networks which is basic to the adaptation of one network to another should be solved.

SUMMARY OF THE INVENTION

To solve the above problem, it is an object of the present invention to provide a method for reassigning channels during the transmission of the IEEE-1394 isochronous data to a synchronous network by which it is possible to perform synchronization among networks by overcoming the differences between the IEEE-1394 network and other networks.

It is another object of the present invention to provide an apparatus for reassigning channels during the transmission of the IEEE-1394 isochronous data to the synchronous network.

Accordingly, to achieve the first object, there is provided a method for reassigning channels during the transmission of isochronous data from the IEEE-1394 network to an external synchronous network, comprising the steps of (a) forming a mapping table showing the relationship between the channels of the IEEE-1394 network and the channels of the external synchronous network when a call is set with respect to the external synchronous network, (b) reading the channel order from the header of the isochronous data to be transmitted, (c) reassigning the channel order of the IEEE-1394 network according to the channel order of the external synchronous network with reference to the mapping table, and (d) transmitting the isochronous data to the external synchronous network according to the reassigned channel order.

To achieve the second object, there is provided an apparatus for reassigning channels during the transmission of isochronous data from the IEEE-1394 network to an external synchronous network, comprising a memory for sequentially storing the isochronous data to be transmitted and storing a mapping table showing the relationship between the channels of the IEEE-1394 network and the channels of the external synchronous network, a logic unit for forming the mapping table when the isochronous data is stored in the memory and reassigning the channel order of the IEEE-1394 network according to the channel order of the external synchronous network with reference to the mapping table, and a controller for controlling the operation of the logic unit and transmitting the isochronous data stored in the memory according the reassigned channel order when the channel order of the IEEE-1394 network is reassigned by the logic unit.

BRIEF DESCRIPTION OF THE DRAWING(S)

The above objects and advantages of the present invention will become more apparent by describing in detail a preferred embodiment thereof with reference to the attached drawings in which.

DESCRIPTION OF THE PREFERRED EMBODIMENTS

Hereinafter, a method for reassigning channels during the transmission of IEEE-1394 isochronous data to a synchronous network according to the present invention and the structure and the operation of an apparatus therefor will be described as follows with reference to the attached drawings.

Figure 4:
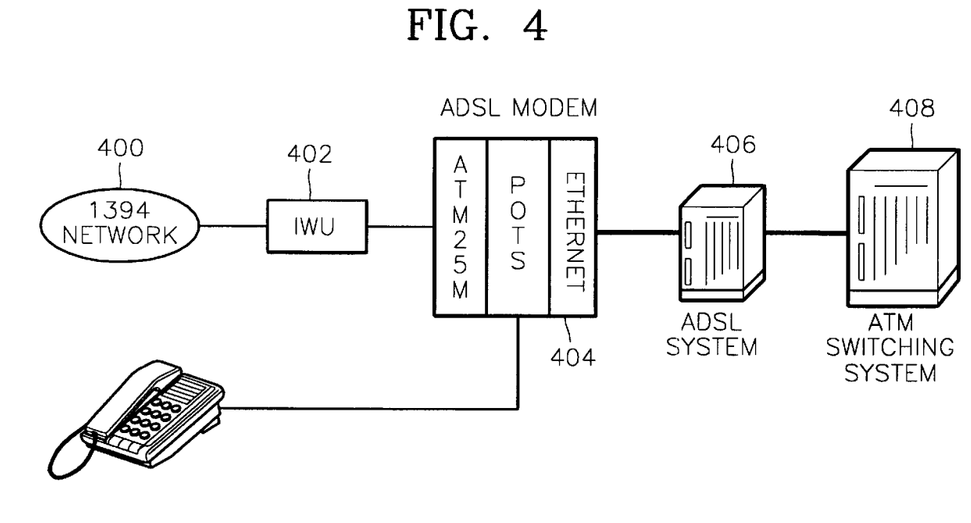
FIG. 4 shows an example of the connection of the IEEE-1394 network to an external synchronous network according to the present invention.
Figure 5:
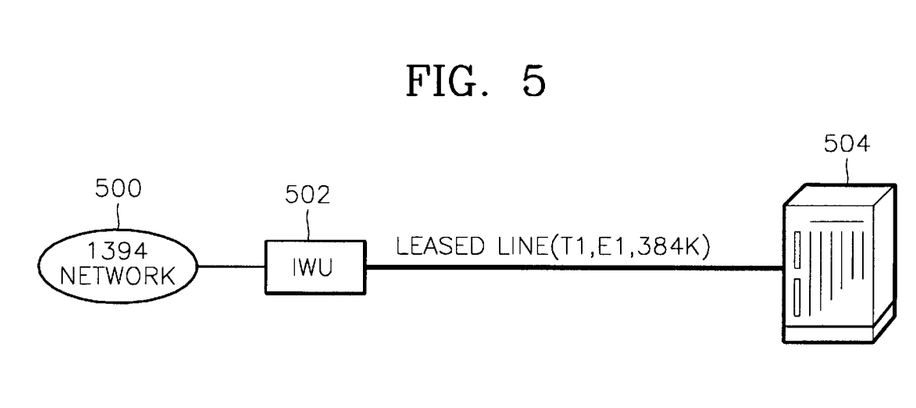
FIG. 5 shows another example of the connection of the IEEE-1394 network to an external synchronous network according to the present invention.

FIG. 4 shows an example of the connection of the IEEE-1394 network to an external synchronous network according to the present invention. FIG. 5 shows another example of the connection of the IEEE-1394 network to the external synchronous network according to the present invention.

As an automatic dynamic simulation language (ADSL) technology is introduced to a home network, the home network shown in FIG. 4 can be considered. An inter-working unit (IWU) 402, an automatic dynamic simulation language (ADSL) modem 404, and an ADSL system 406 can be positioned between an IEEE-1394 network 400 and an ATM switching system 408. The IWU 402 serves as an interface for connecting the IEEE-1394 network 400 to ATM25M of the ADSL modem 404.

FIG. 5 shows a case where a line leased from a switching system 504 of a central telephone office is used in an office in which an IEEE 1394 network 500 is constituted. The IWU 502 serves as an interface for connecting the IEEE-1394 network 500 to the switching system 504.

Figure 6:
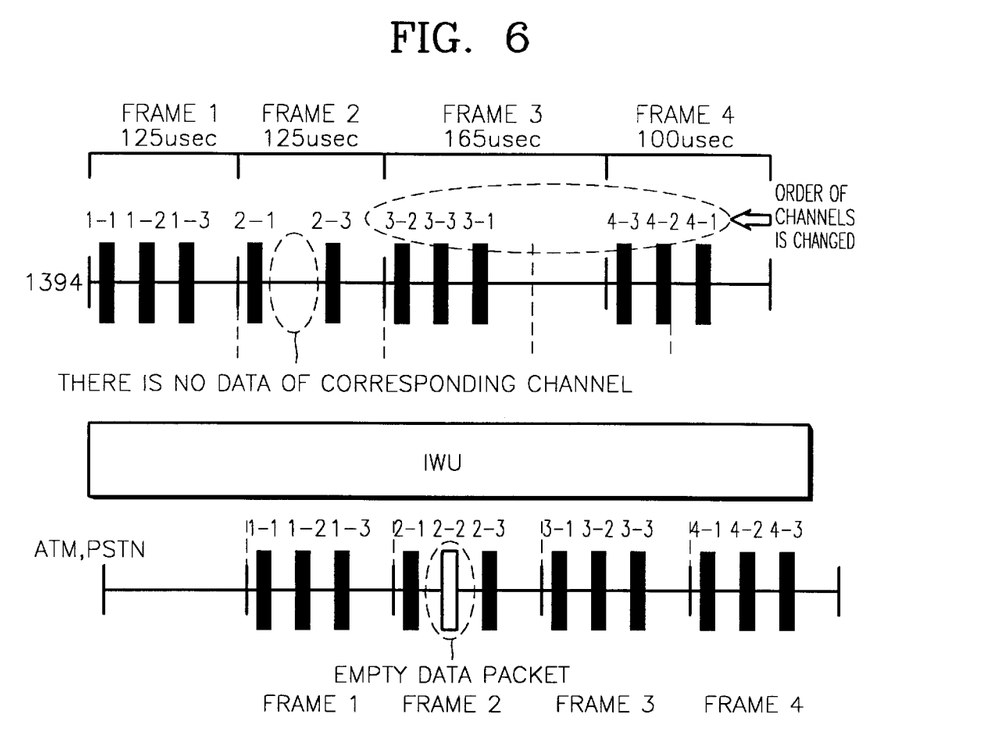
FIG. 6 shows processes by which the IEEE-1394 network is adapted to the external synchronous network according to an inter-working unit (IWU) of the present invention.

FIG. 6 shows processes by which the IEEE-1394 network is adapted to the external synchronous network according to the IWU of the present invention.

The IWU 502 according to the present invention synchronizes one network with another among networks. Referring to FIG. 6, it is noted that the transmission characteristic of the isochronous data transmitted from the IEEE-1394 network is different from the transmission characteristic of the data transmitted from the ATM or the PSTN. In the present invention, it is desired that the isochronous data of the IEEE-1394 network is transmitted through the IWU 502 according to the transmission characteristic of the ATM or the PSTN.

In the data transmission of the ATM network and the PSTN, since data should be uniformly loaded into a corresponding channel at 125 μs intervals, even an empty data packet should be transmitted if there is no data to transmit on the corresponding channel after the interval of 125 μs. In the ATM or the PSTN, since the order of channels should be uniform, an algorithm for aligning the channels in a regular order should be applied to a memory and a logic circuit. The channels of the PSTN are assigned from the switching system. Vpi and Vci of the ATM are determined by the switching operation of the ATM switching system.

Referring to FIG. 6, in the isochronous data of the IEEE-1394 network, a synchronous signal should be generated at 125 μs intervals. However, the 125 μs intervals are not guaranteed due to the influence of an asynchronous transmission. For example, the 125μ intervals are maintained in frames 1 and 2. However, the interval can be delayed to 165μ in frame 3. In this case 100 μs intervals should be maintained in several frames after the frame 3. Also, when the channels are numbered as 1, 2, and 3 for convenience, the order of the channels (1-1, 1-2, and 1-3) kept in the frame 1 is not continuously kept in the next frame due to the data transmission characteristic of the IEEE-1394 network. Also, when no data exists in the corresponding channel like in the frame 2, an empty data packet is not transmitted.

As mentioned above, the IEEE-1394 network is different from the ATM or the PSTN in its data transmission characteristic. The IWU 502 according to the present invention delays frames by one frame, reassigns the channel order according to the channel order assigned from the external synchronous network, and then transmits data, thus synchronizing the IEEE-1394 network with the ATM network or the PSTN. Namely, the IWU 502 operates as a channel reassigning apparatus.

Figure 7:
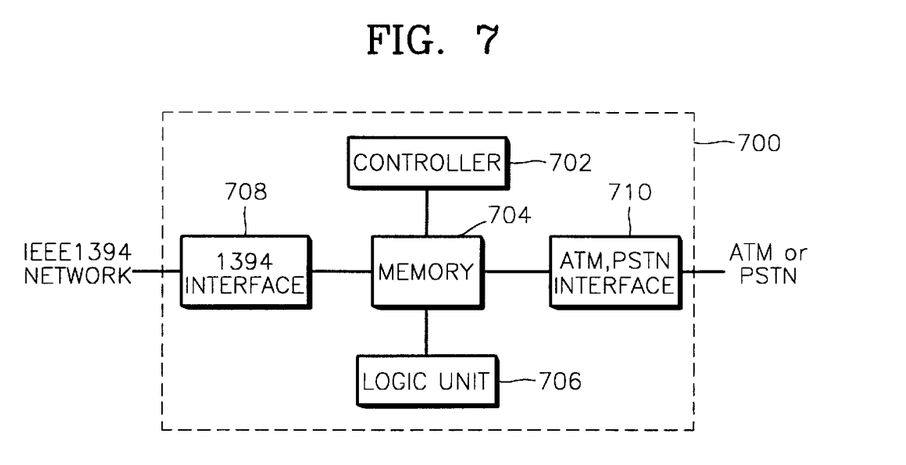
FIG. 7 is a detailed block diagram of the IWU according to the present invention.

FIG. 7 is a detailed block diagram of the IWU 700 according to the present invention. The IWU includes a controller 702, a memory 704, a logic unit 706, an 1394 interface 708, and an ATM/PSTN interface 710.

The controller 702 controls the operation of the logic unit 706. When the channel order of the IEEE-1394 network is reassigned by the logic unit 706, the controller 702 transmits the isochronous data stored in the memory 704 according to the reassigned channel order. At this time, the transmitted isochronous data are delayed by one frame.

The memory 704 sequentially stores the isochronous data to be transmitted through the 1394 interface 708. Also, the memory 704 stores a mapping table which is formed by the logic unit 706, showing the relationship between the channels of the IEEE-1394 network and the channels of the ATM network or the PSTN.

When the isochronous data is stored in the memory 704, the logic unit 706 forms the mapping table and reassigns the channel order of the IEEE-1394 network according to the channel order of the ATM or the PSTN with reference to the mapping table.

The logic unit 706 sequentially reads channel numbers from the first frame of the isochronous data stored in the memory 704 and records the channel numbers, and requests the channel numbers in the ATM or the PSTN corresponding to the recorded channel numbers from the ATM or the PSTN. The logic unit 706 forms the mapping table constituted of the channel numbers with respect to a predetermined number of channels of the IEEE-1394 network and the channel numbers uniquely assigned from the ATM or the PSTN corresponding to the channel numbers with respect to the channels of the IEEE-1394 network.

Also, the logic unit 706 includes a counter (not shown) for counting the number of channels using an IEEE-1394 isochronous gap in each frame of the isochronous data stored in the memory 704. The counter down-counts the number of channels whenever the isochronous data is transmitted in units of a channel and checks whether the last channel is transmitted.

Figure 8:
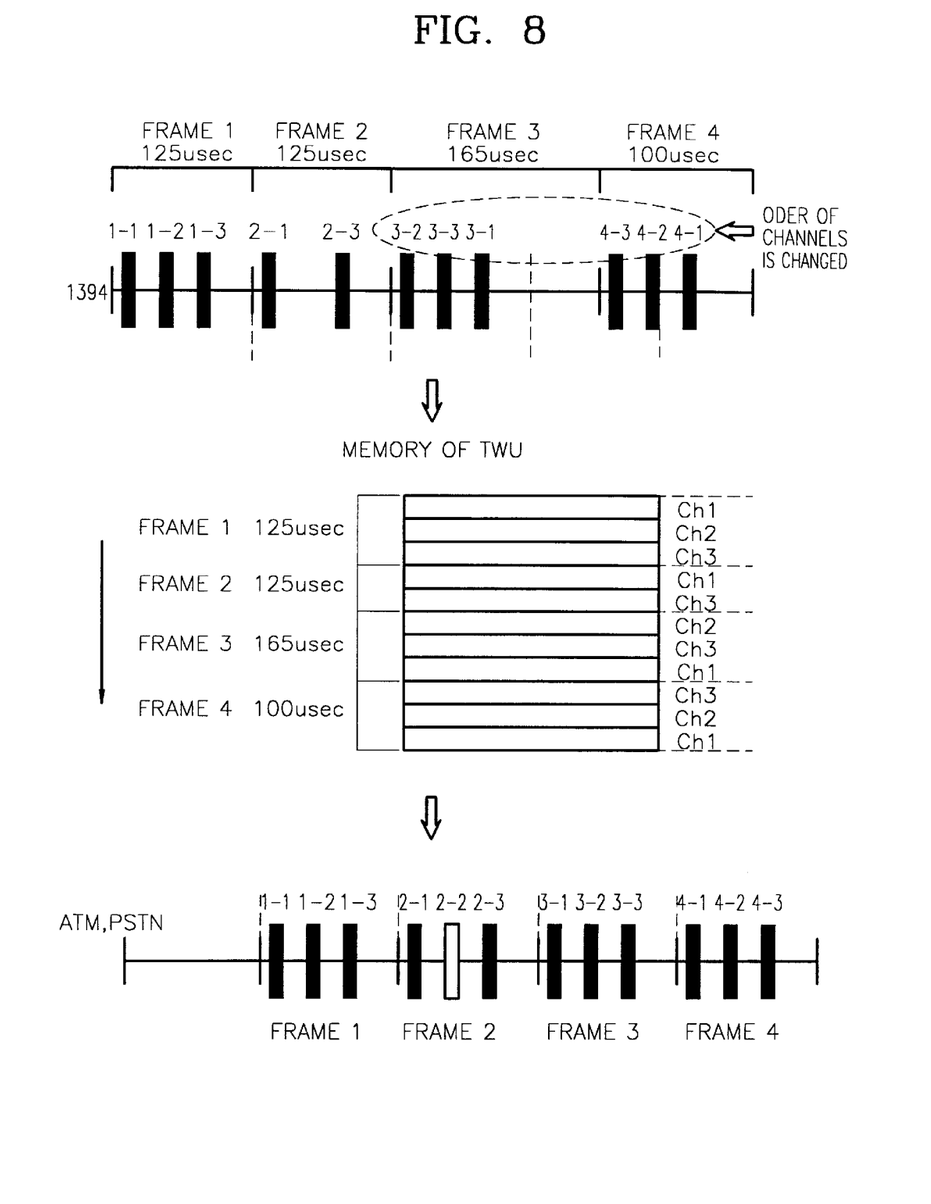
FIG. 8 shows processes by which the IEEE-1394 network is adapted to an external synchronous network through the memory shown in FIG. 7.

FIG. 8 shows processes by which the IEEE-1394 network is adapted to the external synchronous network through the memory shown in FIG. 7.

In the IEEE-1394 network, the isochronous data stored in the memory should be transmitted as shown in FIG. 8. In FIG. 8, it is assumed that each of the IEEE-1394, the PSTN, and the ATM includes three channels and that the channel numbers are 1, 2, and 3. Actually at present, the IEEE-1394 may include up to 63 channels.

In FIG. 8, when the data is transmitted from the ATM or the PSTN to the IEEE-1394 network, there is no problem in the operation of the IEEE-1394 network since a constant channel order is maintained. In FIG. 8, when the speed of the IEEE-1394 network is 100 Mbps, since the maximum length of an isochronous packet is 1024 bytes, the reference of the memory offset is considered in units of 1024 bytes.

Figure 9:
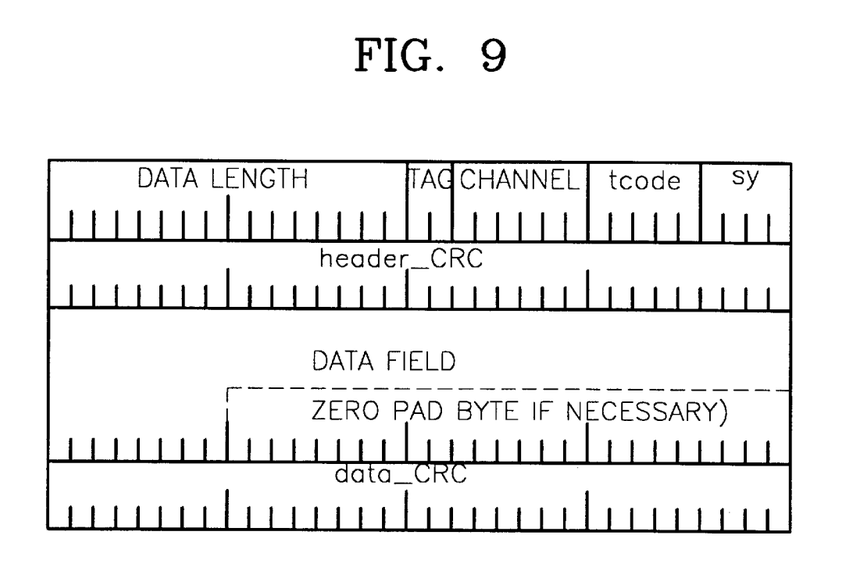
FIG. 9 shows a packet format of IEEE-1394 synchronous data.

In order to know the IEEE-1394 channel number of the corresponding data, information in 18–24 bits part is read and the remaining part is masked from the first quadlet of the header of an isochronous packet. FIG. 9 shows the packet format of the IEEE-1394 isochronous data.

Figure 10:
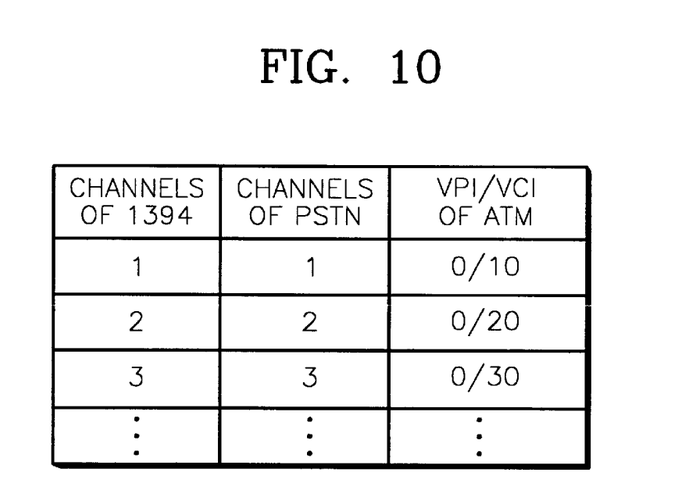
FIG. 10 shows a preferred example of a mapping table included in the IWU.

FIG. 10 shows a preferred example of the mapping table included in the IWU.

The mapping table is constituted of the channel information read from the first frame. In the next frame, data is transmitted, while loaded into the corresponding Vpi/Vci or the corresponding channel (time slot) of the ATM or the PSTN according to the channel information of the mapping table read from first frame. In the mapping table of FIG. 10, the channels of the PSTN or Vpi/Vci of the ATM are the values assigned from a TDM switching system or the ATM switching system, which are used for convenience.

Figure 11:
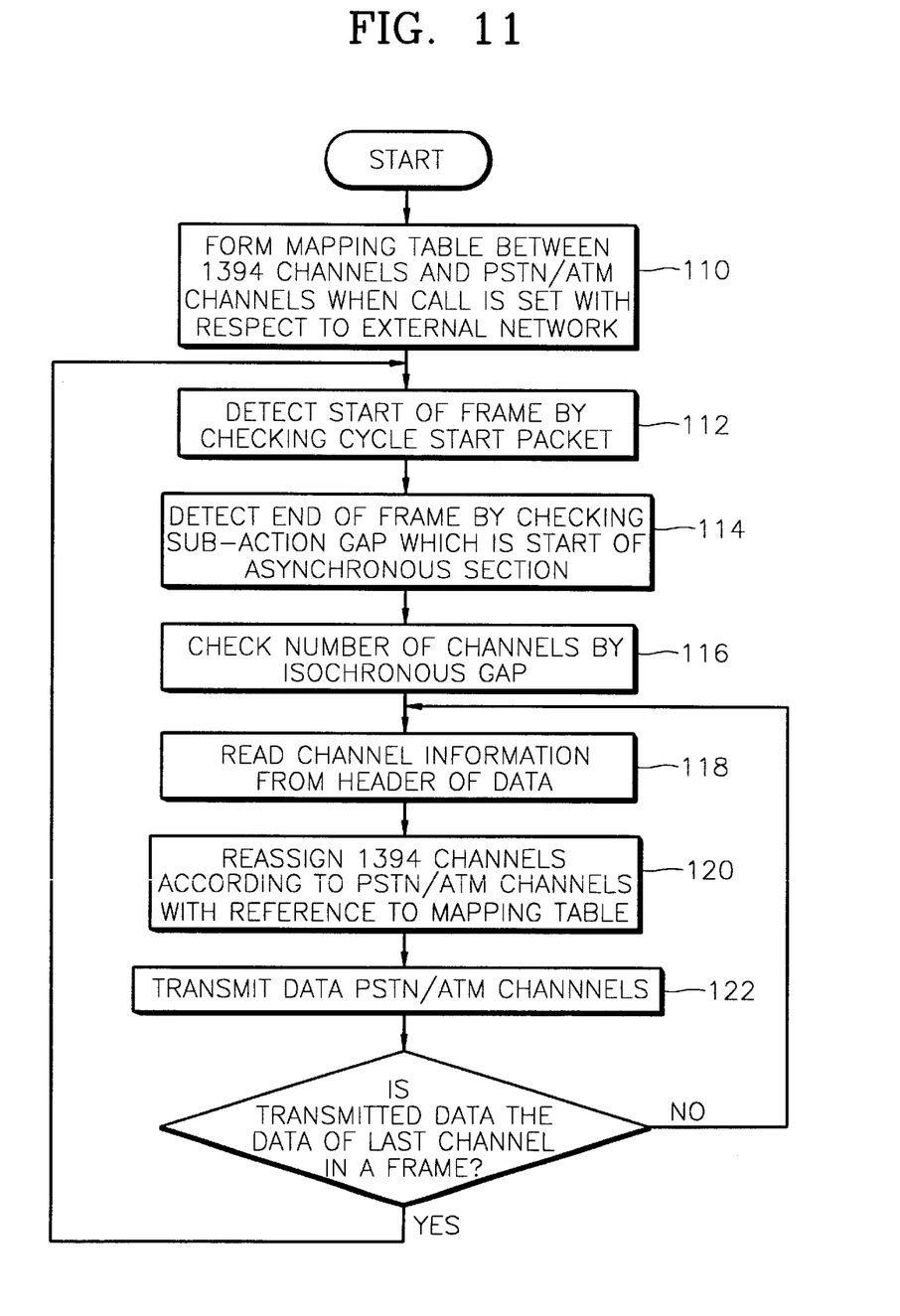
FIG. 11 is a flowchart for describing a method for reassigning channels according to the present invention.

FIG. 11 is a flowchart for describing the method for reassigning channels according to the present invention when isochronous data is transmitted from the IEEE-1394 network to the external synchronous network.

First, the mapping table showing the relationship between the channels of the IEEE-1394 network and the channels of the external synchronous network such as the ATM and the PSTN is formed when a call is set with respect to the external synchronous network (step 110).

Here, the mapping table is constituted of a series of channel numbers corresponding to a predetermined number of channels of the IEEE-1394 network, and channel numbers in the external synchronous network corresponding to the respective channel numbers which correspond to the channels of the IEEE-1394 network. The channel numbers in the external synchronous network are uniquely assigned from the external synchronous network by the request of the IEEE-1394 network when a call is set with respect to the external synchronous network.

When the data transmission starts after the mapping table is formed, the start of each frame is detected by checking the cycle start packet of an isochronous packet in the IEEE-1394 data format (step 112). The end of each frame is detected by checking the start sub-action gap of an asynchronous section (step 114). The number of channels is checked using the IEEE-1394 isochronous gap between the detected start of each frame and the detected end of each frame (step 116).

Figure 12:
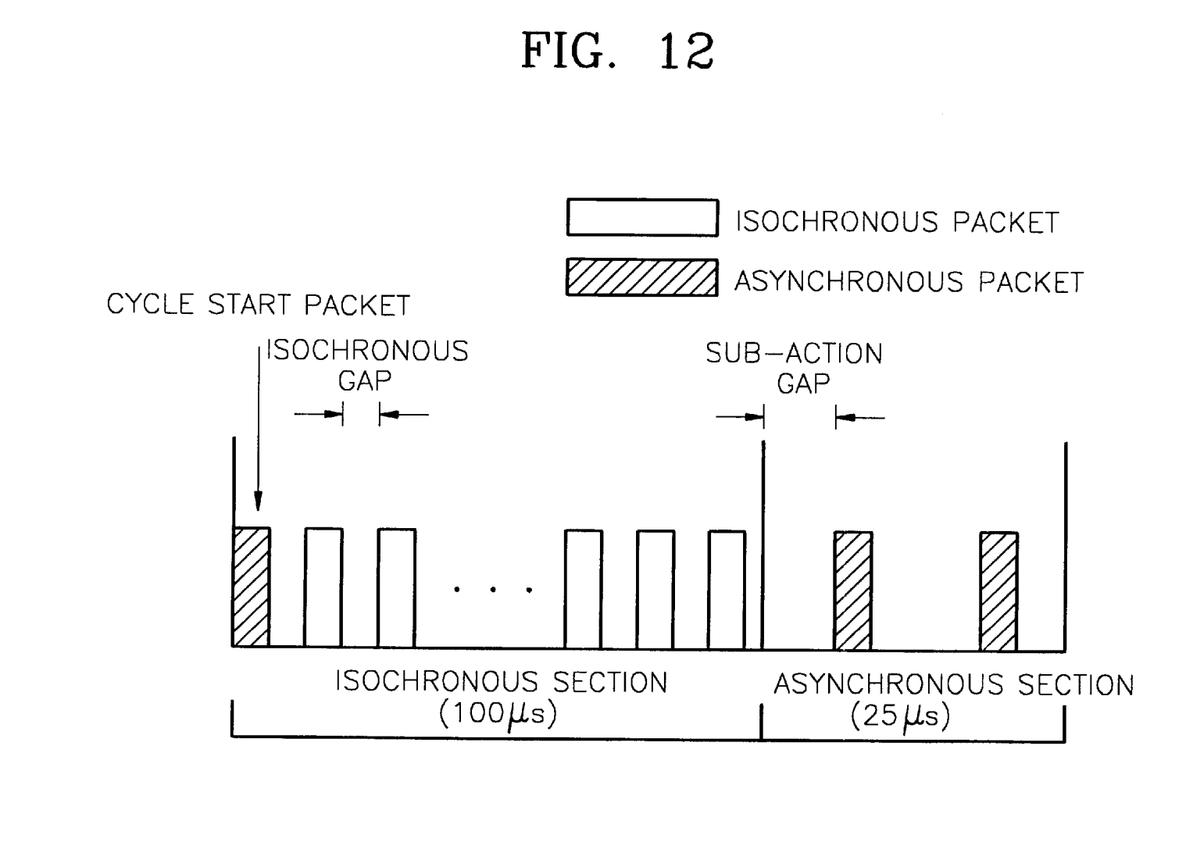
FIG. 12 shows the IEEE-1394 data frame format.

FIG. 12 shows the IEEE-1394 data frame format. The IEEE-1394 data frame has an isochronous section and an asynchronous section. The start of the isochronous section can be detected by the cycle start packet. The start of the asynchronous section can be detected by the sub-action gap. Referring to FIG. 12, the number of channels in a frame can be determined by counting the isochronous gap using the counter included in the logic unit 706 of FIG. 7. The isochronous gap is a maximum of 0.05 $\mu$s. The sub-action gap is a minimum of 5 $\mu$s. Whenever data is transmitted to the PSTN or the ATM, the value counted by the counter is down-counted. When the data transmissions of all channels in a frame ends, the value of the counter will be '0'.

After the step 116, the channel order is read from the header of the isochronous data to be transmitted (step 118). Other parts than the channel bit (18–24 bits) part of the first quadlet of the header are masked in the isochronous packet, the channel information, that is, the channel number of the current packet,can be checked. The channel order of the IEEE-1394 network is reassigned according to the channel order of the external synchronous network with reference to the mapping table (step 120). The isochronous data is transmitted to the external synchronous network according to the reassigned channel order (step 122).

After the step 122, it is determined whether the transmitted data is the data of the last channel by down-counting the number of the channels checked in the step 116 (step 124). When the transmitted data is not the data of the last channel, the process returns to the step 118 and the above-mentioned operations steps 118–124 are performed again. When the transmitted data is the data of the last channel, the process returns to the step 112 for the transmission of the next frame and the above-mentioned operations steps 112–124 are performed again.

As mentioned above, in the method for reassigning channels during the transmission of the IEEE-1394 isochronous data to the synchronous network and the apparatus therefor according to the present invention, the IEEE-1394 network is synchronized with other networks by overcoming the differences between the IEEE-1394 network and other networks. Accordingly, users connected to the local area network (LAN) constituted of the IEEE-1394 network can transmit data in real time and perform a video conference without being restricted by the external network.

What is claimed is:

1. A method for reassigning channels during a transmission of isochronous data from an IEEE-1394 network to an external synchronous network, comprising the steps of:

(a) forming a mapping table indicative of a relationship between channels of the IEEE-1394 network and channels of the external synchronous network when a call is set between the IEEE-1394 network and the external synchronous network;

(b) reading a channel order of the IEEE-1394 network from a header of isochronous data to be transmitted from the IEEE-1394 network;

(c) reassigning the channel order of the IEEE-1394 network according to a channel order of the external synchronous network with reference to the mapping table; and (d) transmitting the isochronous data to the external synchronous network according to the reassigned channel order.

2. The method of claim 1, wherein, in the step (a), the mapping table comprises:

channel numbers corresponding to predetermined channels of the IEEE-1394 network, and channel numbers corresponding to channel numbers of the channels in the external synchronous network which respectively correspond to the channels of the IEEE-1394 network, and wherein the channel numbers in the external synchronous network are uniquely assigned from the external synchronous network by request of the IEEE-1394 network when the call is set between the IEEE-1394 network and the external synchronous network.

3. The method of claim 1, after the step (a), further comprising the steps of:

(i) detecting a start of each frame by checking a cycle start packet of an isochronous section in IEEE-1394 data format when the data transmission starts after the mapping table is formed;

(ii) detecting an end of each frame by checking a start sub-action gap of an asynchronous section in the IEEE-1394 data format; and (iii) checking a number of the channels of the IEEE-1394 network using an IEEE-1394 isochronous gap between the detected start of each frame and the detected end of each frame, and after the step (d), determining whether the transmitted data is data of the last channel of the channels of the IEEE-1394 network by down-counting the number of channels, and proceeding to the step (b) when the transmitted data is not the data of the last channel.

4. An apparatus for reassigning channels during a transmission of isochronous data from an IEEE-1394 network to an external synchronous network, comprising:

a memory for sequentially storing the isochronous data to be transmitted and storing a mapping table indicative of a relationship between channels of the IEEE-1394 network and channels of the external synchronous network;

a logic unit for forming the mapping table when the isochronous data is stored in the memory and reassigning a channel order of the channels of the IEEE-1394 network according to a channel order of the channels of the external synchronous network with reference to the mapping table; and a controller for controlling the logic unit and transmitting the isochronous data stored in the memory according to the reassigned channel order.

5. The apparatus of claim 4, wherein the logic unit sequentially reads channel numbers from a first frame of the isochronous data stored in the memory, records the read channel numbers, requests channel numbers corresponding to the respective recorded channel numbers from the external synchronous network, and forms the mapping table, the mapping table comprising channel numbers corresponding to a predetermined number of the channels of the IEEE-1394 network and channel numbers, uniquely assigned from the external synchronous network, corresponding to the channel numbers of the IEEE-1394 network.

6. The apparatus of claim 4, wherein the logic unit comprises a counter for counting number of the channels of the IEEE-1394 network using an IEEE-1394 isochronous gap in each frame of the isochronous data stored in the memory, and wherein the counter detects a last channel of the IEEE-1394 network by down-counting the number of the channels whenever the isochronous data is transmitted in units of a channel.

* * * * *